Dec. 2, 1958 F. H. MAGNUS 2,862,325
FISHING LURES
Filed April 4, 1955
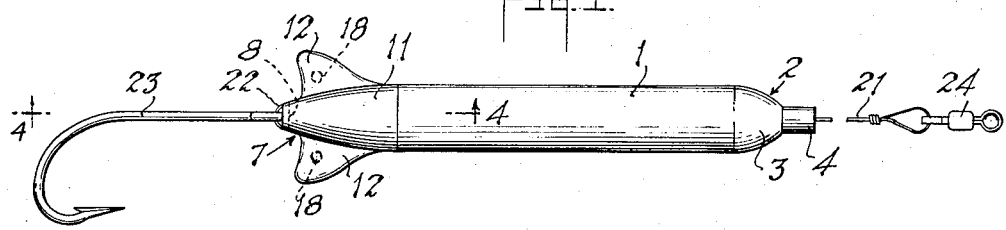
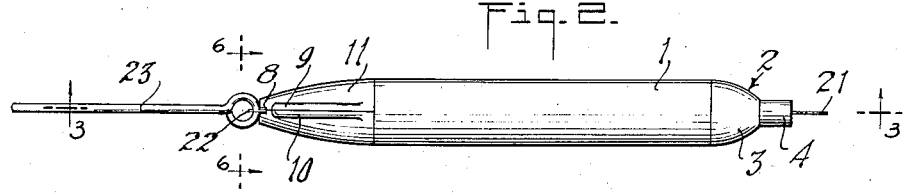
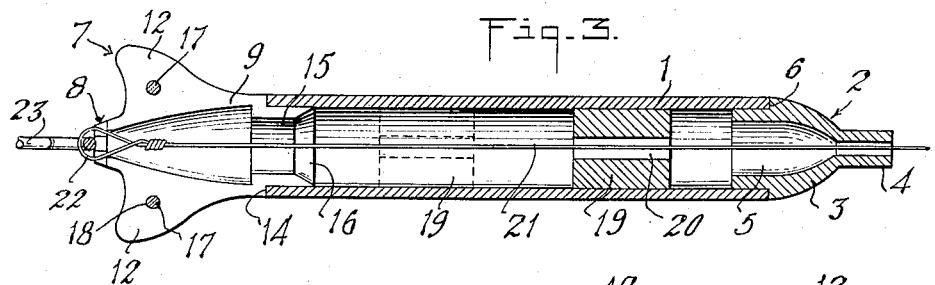
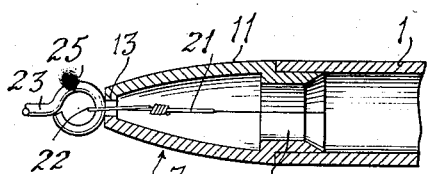
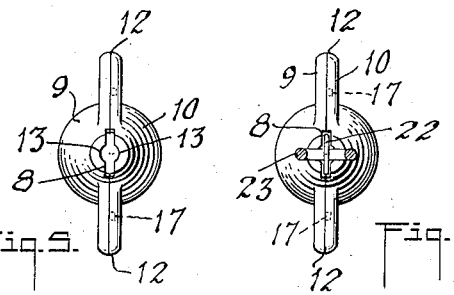
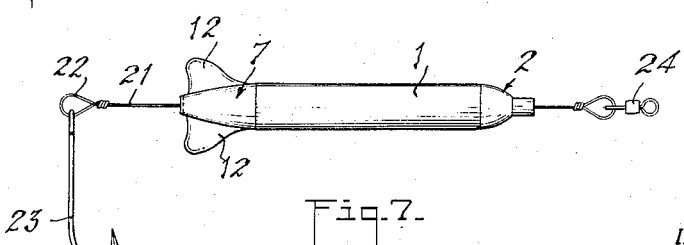
INVENTOR.
Finn H. Magnus,
BY
ATTORNEY

United States Patent Office 2,862,325
Patented Dec. 2, 1958

2,862,325

FISHING LURES

Finn H. Magnus, Essex Fells, N. J.

Application April 4, 1955, Serial No. 498,830

2 Claims. (Cl. 43—42.22)

This invention relates to new and useful improvements in fishing lures and more particularly to a fishing lure that will oscillate about its longitudinal axis and dive or dart in a manner so as to attract fish when the lure is drawn through water.

A prime object of the present invention is to provide a fishing lure of this character embodying a novel and improved construction whereby the lure will realistically simulate the appearance of a live fish and which will exhibit life-like movements when drawn through the water.

Another object of the invention is to provide a fishing lure so constructed that weights of different size may be readily inserted into the lure and adjusted longitudinally of the lure so as to cause different movements of the lure in the water and to facilitate casting.

Still another object of the invention is to provide a fishing lure having a body with a smooth and streamlined exterior so that the danger of weeds or grass becoming caught on the lure during the trolling is reduced.

It is further proposed to provide a fishing lure which is simple and durable in construction and which can be manufactured and sold at a reasonable cost.

Other objects and advantages of the invention will be apparent from the description thereof to follow taken in conjunction with the accompanying drawings in which:

Figure 1 is a side elevational view of a fishing lure embodying my invention showing the hook in operative position.

Figure 2 is a similar view turned 90°.

Figure 3 is a longitudinal sectional view taken on the plane of the line 3—3 of Figure 2, showing the weight in adjusted moved position in dotted lines.

Figure 4 is a fragmentary sectional view taken on the plane of the line 4—4 of Figure 1.

Figure 5 is an end view looking toward the tail end of the lure, the hook being omitted.

Figure 6 is a cross-sectional view taken on the plane of the line 6—6 of Figure 2.

Figure 7 is a view similar to Figure 1 on a reduced scale, showing the hook spaced from the tail piece, in collapsed, inoperative position.

Referring in detail to the drawing, the illustrated embodiment of the invention comprises an elongated hollow cylindrical body 1, of uniform diameter throughout, open at both ends, and preferably made of suitable plastic material providing a smooth, outer surface. A head 2, of similar material, is plugged into the front end of the body and includes a hollow substantially frusto-conical body portion 3 merging gracefully at its front end into a portion reduced in diameter and forming a tubular extension 4. At its rear end, the body portion 3 is formed with a cylindrical portion 5, reduced in diameter, forming a shoulder 6 abutting against the front end edge of the body 1 of the lure as best seen in Figure 3.

A tail piece, indicated generally at 7, similar in appearance to the tail of a bait fish, is plugged into the rear end of the body 1. This tail piece is made of plastic material and comprises two halves 9 and 10, each shaped as shown in Figure 3 so that when superimposed they form an elongated hollow substantially frusto-conical body portion 11 with laterally extending wing portions forming opposed fins 12. The rear narrow end of the body portion 11 of the tail piece is formed with a slot 8, the walls of said slot defining opposed grooves 13, midway the ends of the slot. The body portion 11 at its inner or front end is formed with a portion reduced in diameter to provide an annular exterior shoulder 14 and a tubular extension 15, said extension having a tapered inner surface at its free end as indicated at 16. The tubular extension 15 is fitted into the rear end of the body 1, with its shoulder 14 abutting against the rear end edge of the body. The halves 9 and 10 of the tail piece are fastened together by protuberances 17 projecting from the inner surface of one of said halves, for example, the half 9, and snapped into complemental recesses or shallow sockets 18 formed on the inner surface of the other half 10.

A cylindrical weight member 19 having a central bore 20 is closely fitted within the body 1 adjacent the head 2 so as not to become accidentally displaced in use, but is capable of being pressed along the body 1 to any desired position, such as the position shown in dotted lines in Figure 3.

A wire constituting a leader 21 extends freely through the hollow lure body 1, passing through the bore 20 of the weight member 19 and out through the slot 8 in the tail piece 7 where it is formed with a loop 22 for attachment to a hook 23. At its front end, the leader is connected to a swivel joint 24 for attachment to a fishing line (not shown). When the lure is being drawn through the water, the leader pulls the hook tightly against the rear end of the tail piece with the eye 25 of the hook firmly seated against the wall edges of the grooved portions 13 of the slot 8 and the loop 22 of the leader disposed at right angles thereto in the slot 8 so that the hook is held in a position forming an elongation of the lure body 1 as shown in Figure 1. The leader is sufficiently long so that when the lure is not in use, the leader may be drawn rearwardly of the tail piece to permit the hook to collapse as shown in Figure 7 for storage or other purposes.

In use, when the lure is drawn through the water, the leader is pulled from the position shown in Figure 7 to the position shown in Figure 1 with the loop 22 disposed in the slot 8, and the lure body and hook oscillating about the longitudinal axis of the body, the fins simulating the tail fins of a bait fish and the weight causing the lure to dart from side to side and to dive in further simulation of the movements of a fish.

The lure can be easily and quickly assembled and a weight 19 of the desired size can be easily pushed into the body 1 from either end thereof before the tail piece and the head are attached to the body, the weight being frictionally held in the desired position in the body.

The body 1, head 2 and tail piece 7 may be colored in any desired color, or such parts may be colored in any contrasting colors in order to make the lure more attractive.

It will be seen that the parts of the lure may be readily assembled to form a smooth, symmetrical, streamlined fishing lure, eliminating any likelihood of weeds, grass and the like, catching on the exterior surface thereof.

While I have illustrated and described the preferred embodiment of the invention, it will be understood that changes in details might be made without departing from the principle of the invention and I desire therefore to be limited only by the state of the prior art and the appended claims.

What I claim as new and desire to secure by United States Letters Patent is:

1. A fishing lure comprising an elongated tubular body, a tubular substantially frusto-conical shaped head plugged in one end of the body, said body being formed with a shoulder immediate its ends which abuts against the front end of said tubular body and being arcuately curved from said shoulder in a forward direction and terminating in a cylindrical portion, a hollow substantially frusto-conical shaped tail piece plugged into the other end of the body and having a longitudinal opening therethrough, a leader extending freely through said head, and through the body and the opening in the tail piece, a hook on the rear end of said leader adapted to be drawn tightly against the rear end of the tail piece, said tail piece being tapered from its front to its rear end and being formed with a pair of cross slots in its rear end adapted to receive a leader eye and hook respectively, two superposed complemental halves having abutting faces in an axial plane of said body, said halves each having laterally extending fin portions and the fin portions of one of said halves being superposed on the fin sections of the other half.

2. A fishing lure as defined in claim 1 wherein said body has a cylindrical opening therethrough, and with the addition of a cylindrical weight snugly fitted into said opening and having a coaxial hole therethrough, said leader extending freely through said hole in said weight.

References Cited in the file of this patent

UNITED STATES PATENTS

| | | |
|---|---|---|
| 963,202 | Bohannan | July 5, 1910 |
| 1,316,040 | Jamison | Sept. 16, 1919 |
| 1,434,204 | Grounsell | Oct. 31, 1922 |
| 1,451,436 | Barnia | Apr. 10, 1923 |
| 1,454,820 | Readle | May 8, 1923 |
| 1,610,204 | Donholt | Dec. 7, 1926 |
| 2,036,954 | Murray | Apr. 7, 1936 |
| 2,538,181 | Yates | Jan. 16, 1951 |
| 2,640,292 | Nodolny | June 2, 1953 |
| 2,706,359 | Beames | Apr. 19, 1955 |
| 2,740,220 | Caplan | Apr. 13, 1956 |